(12) United States Patent
Huebler et al.

(10) Patent No.: US 7,036,493 B1
(45) Date of Patent: May 2, 2006

(54) INTAKE MANIFOLD FOR AN INTERNAL COMBUSTION ENGINE

(75) Inventors: Mark Steven Huebler, Shelby Township, Macomb County, MI (US); Yongsheng He, Sterling Heights, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/961,693

(22) Filed: Oct. 8, 2004

(51) Int. Cl.
*F02M 25/07* (2006.01)
*F02M 35/10* (2006.01)

(52) U.S. Cl. .................... 123/568.17; 123/184.24; 123/184.42

(58) Field of Classification Search .......... 123/568.11, 123/568.17, 568.18, 184.21, 184.24, 184.34, 123/184.37, 184.42, 184.51, 184.52, 198 E
See application file for complete search history.

(56) References Cited

U.S. PATENT DOCUMENTS

| | | | | |
|---|---|---|---|---|
| 4,425,881 A | * | 1/1984 | Lyndhurst | 123/184.34 |
| 4,628,879 A | * | 12/1986 | Futakuchi | 123/184.34 |
| 4,697,569 A | * | 10/1987 | Hertweck et al. | 123/568.17 |
| 4,726,329 A | * | 2/1988 | Atkin | 123/184.34 |
| 4,977,866 A | * | 12/1990 | Wilkins | 123/184.34 |
| 5,829,402 A | * | 11/1998 | Takahashi et al. | 123/184.24 |
| 6,029,637 A | * | 2/2000 | Prior | 123/184.34 |
| 2004/0118371 A1 | * | 6/2004 | Kino et al. | 123/184.42 |

* cited by examiner

*Primary Examiner*—Willis R. Wolfe, Jr.
(74) *Attorney, Agent, or Firm*—Kathryn A. Marra

(57) ABSTRACT

An air intake system for an internal combustion engine includes a manifold defining a chamber. The chamber is divided into a first chamber portion and a second chamber portion by a permeable member for fluid communication between the first chamber portion and the second chamber portion. The permeable member facilitates mixing of air and exhaust gas for more consistent EGR distribution among a plurality of cylinders.

11 Claims, 2 Drawing Sheets

INTAKE MANIFOLD FOR AN INTERNAL COMBUSTION ENGINE

CROSS REFERENCE TO RELATED APPLICATIONS

This application claims the benefit of U.S. Provisional Application No. 60/508,518, filed Oct. 3, 2003, which is hereby incorporated by reference in its entirety.

TECHNICAL FIELD

This invention relates to internal combustion engine intake manifolds that define a chamber divided by a splitter plate to facilitate more consistent exhaust gas recirculation distribution among engine cylinders.

BACKGROUND OF THE INVENTION

The use of an exhaust gas recirculation (EGR) system to recirculate internal combustion engine exhaust gas to an inlet air path of an engine is well known. EGR can lower the level of certain undesirable engine emission components such as nitrogen oxide (NOx) and can improve fuel economy. Up to a limit, NOx emissions decrease with increasing EGR levels. Beyond the limit, EGR can increase formation of other undesirable engine emission components and can reduce vehicle drivability.

EGR typically involves recirculation of exhaust gas through an EGR passage between an engine exhaust conduit and an engine fresh air intake passage. A valve within the EGR passage (the EGR valve) is controlled to vary a restriction within the EGR passage to regulate the flow of exhaust gas therethrough. When EGR is not required, the EGR valve is driven to a full restriction (closed) position, typically through a spring preload. The spring preload is commonly required to be substantial to ensure rapid closing of the EGR valve when necessary, and to ensure proper sealing of a closed EGR valve. When EGR is required, the EGR valve is driven to an open position through application of a position control signal to an actuator mechanically linked to the EGR valve. The degree of opening of the EGR valve varies with the magnitude of the position control signal.

When the EGR valve is open, recirculated exhaust gas enters the fresh air intake passage and flows to the engine cylinders. For optimum performance, the exhaust gas should mix thoroughly with the fresh air so that each cylinder receives substantially identical proportions of fresh air and exhaust gas. Typically, the exhaust gas is added to the fresh air immediately prior to entering an intake manifold to minimize the response time between a signal commanding the EGR valve to open and exhaust gas reaching the engine cylinders.

SUMMARY OF THE INVENTION

An air intake system for an internal combustion engine is provided. The air intake system includes an air intake manifold defining a chamber and having a gas inlet which admits gas, including at least air, into the chamber. The manifold also has a plurality of gas outlets through which gas flows from the chamber to respective cylinders. A gas permeable member divides at least a portion of the chamber into a first chamber portion and a second chamber portion. The plurality of outlets receives gas directly from the second chamber portion.

Preferably, the air intake system also includes an EGR inlet sufficiently positioned so that recirculated exhaust gas enters the first chamber portion. The member directs or deflects at least some of the exhaust gas from the EGR inlet through the first chamber portion, where it diffuses through the member across the length of the manifold to evenly mix with air for consistent exhaust gas distribution among the engine cylinders.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENT

Figure 1:
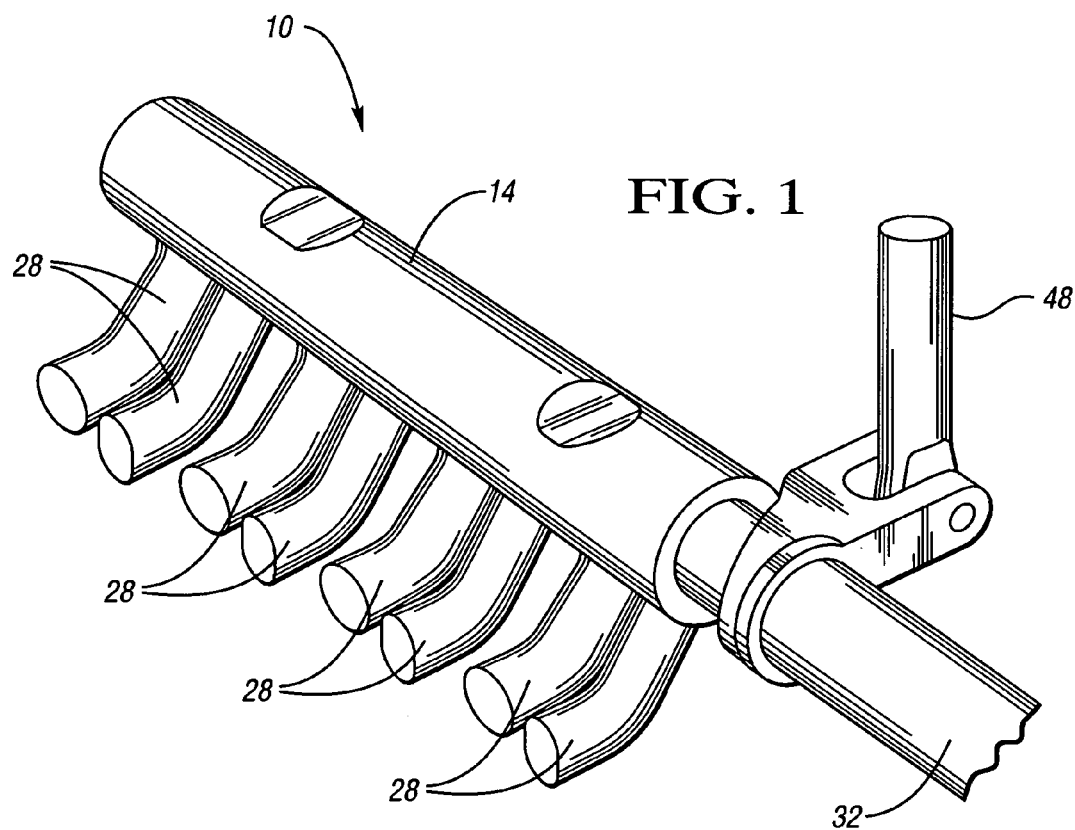
FIG. 1 is a schematic perspective view of an intake manifold for an internal combustion engine.
Figure 2:
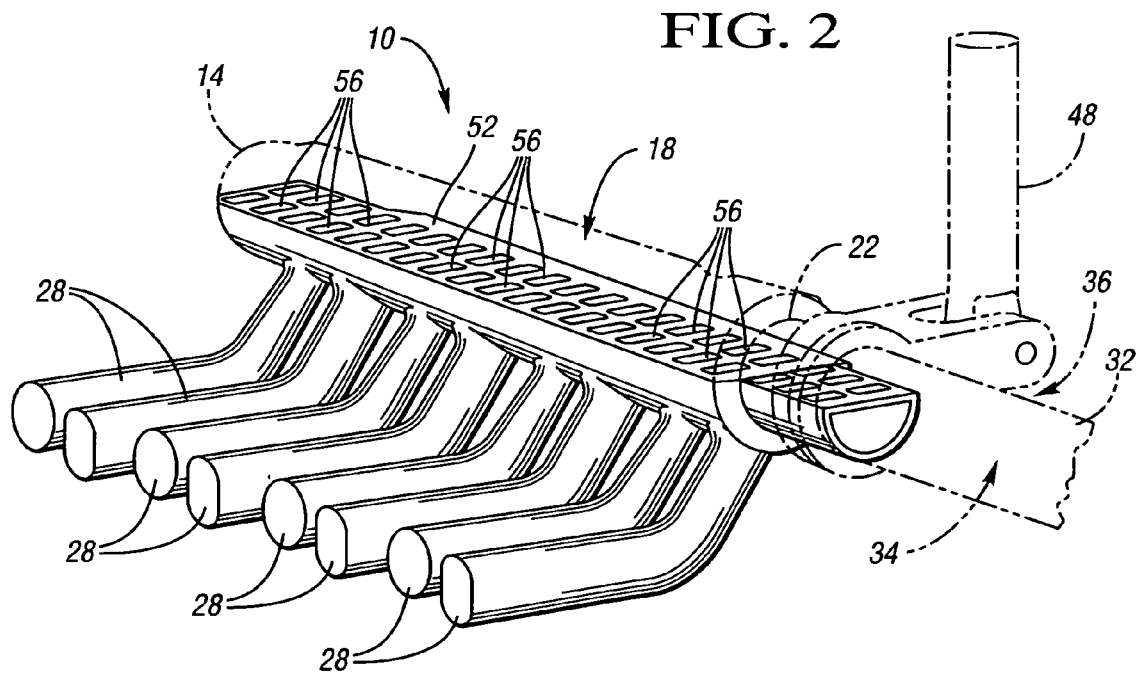
FIG. 2 is a schematic partial cut-away of the air intake system of FIG. 1, illustrating the splitter plate.
Figure 3:
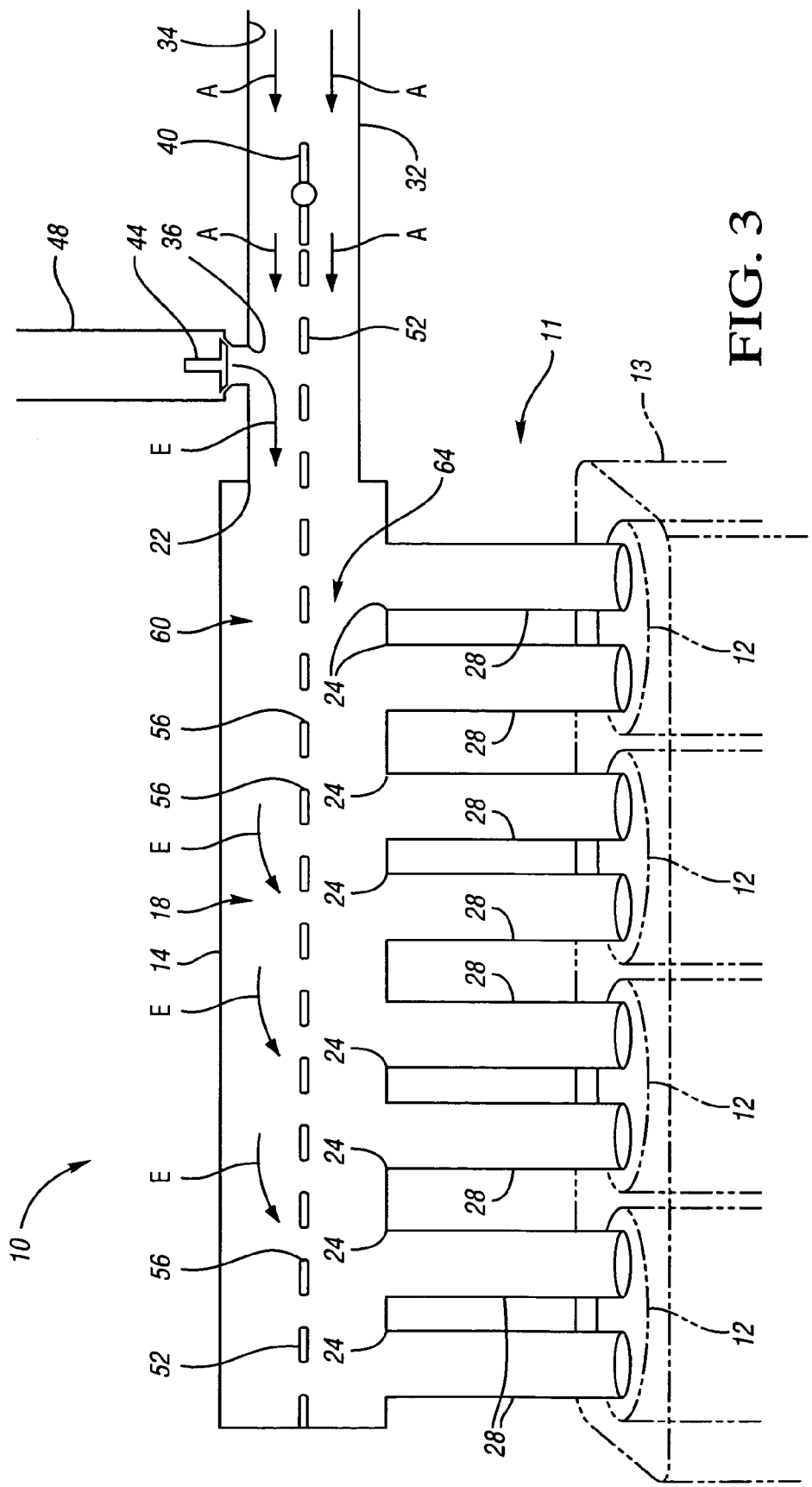
FIG. 3 is a schematic side sectional view of part of an engine including the manifold of FIG. 1 (not drawn to scale)

Referring to FIGS. 1–3, an air intake system 10 for an internal combustion engine 11 is schematically depicted. The air intake system 10 distributes combustion gases, including fresh air and recirculated exhaust gas, to a plurality of engine cylinders 12 formed in engine block 13. The air intake system 10 includes an air intake manifold 14. The air intake manifold 14 in the embodiment depicted is a log style manifold 14, i.e., a substantially cylindrical, elongated member. Exemplary manifold configurations are described in U.S. Pat. No. 4,549,506, issued Oct. 29, 1985 to Rush II et al, which is hereby incorporated by reference in its entirety.

The manifold 14 defines a plenum or chamber 18 having a manifold gas inlet 22 at one end through which combustion gases flow into the chamber 18 during engine operation. The air intake manifold 14 also defines a plurality of gas outlets 24 through which gas flows from the chamber 18 to the engine cylinders 12 via runners 28. The runners 28 are connected to inlet ports (not shown) formed in a cylinder head (not shown) mounted to the engine block, as understood by those skilled in the art. Camshaft operated intake valves (not shown) open to allow combustion gases to flow from the runners 28 to the engine cylinders 12 during an intake stroke, and close to prevent fluid communication between cylinders 12 and the runners 28 during compression, power, and exhaust strokes. The air intake system 10 depicted is configured for an engine that employs two intake valves per cylinder. Accordingly, each cylinder 12 is in fluid communication with the chamber 18 via two runners 28: a primary runner and a secondary runner. However, within the scope of the claimed invention, the air intake system may have only one runner per cylinder.

The air intake system 10 may be employed with any internal combustion engine. A fuel injection system (not shown) is preferably employed to inject fuel vapor into the runners 28 when an intake system is employed with a spark-ignition engine.

The manifold 14 is preferably constructed of a lightweight, high temperature thermoplastic such as poly-amide 66 (nylon 66). However, within the scope of the claimed invention, the intake manifold 14 material need not be limited to a plastic material but may also include traditional materials such as steel, aluminum, magnesium, etc.

A conduit 32, being a zip tube in the present embodiment, defines a passageway 34 that conveys gas to the manifold 14 at the gas inlet 22. The gas includes air (shown at A in FIG. 3) drawn into the passageway 34 through an air filter (not shown) during engine operation. The gas also includes recirculated exhaust gas (shown at E in FIG. 3) from an EGR inlet 36 in the conduit 32 proximate to the gas inlet 22. A throttle plate 40 regulates the flow rate of fresh air, and an EGR valve 44 regulates the flow rate of recirculated exhaust gas. The EGR valve 44 is selectively activated by an engine control module (not shown). Traditional EGR supply systems include a steel tube 48, encased in an insulating material (not shown) to protect surrounding componentry.

The gas outlets 24 and runners 28 are distributed along the length of the manifold 14; thus, the distance between the inlet 22 and any one of the outlets 24 is different from the distance between the inlet 22 and any of the other outlets 24. A gas-permeable member, namely a splitter plate 52, divides the chamber 18 into a first, or upper, chamber portion 60 and a second, or lower, chamber portion 64. The splitter plate 52 defines a plurality of apertures 56 such that the splitter plate is permeable to allow the upper and lower chamber portions 60, 64 to exchange air and recirculated exhaust gas. The splitter plate 52 in the embodiment depicted extends the length of the chamber 18 and substantially bisects it. The splitter plate 52 preferably extends into the passageway 34, bisecting the gas inlet 22 and a portion of the passageway 34.

The outlets 24 and runners 28 are separated from the upper chamber portion 60 by the splitter plate 52 and therefore receive gas directly from the lower chamber portion 64. The splitter plate 52 directs a portion of the gas, i.e., air and exhaust gas, from the passageway 34 into the upper chamber portion 60 and a portion of the gas from the passageway into the lower chamber portion 64. The splitter plate 52 is preferably sufficiently positioned with respect to the EGR inlet 36 such that at least a portion, and preferably a majority, of the recirculated exhaust gas E from the EGR inlet 36 is directed into the upper chamber portion 60.

The splitter plate 52 deflects or directs at least some of the exhaust gas E to flow into the upper chamber portion 60, where it diffuses through the holes 56 into the lower chamber portion 64 substantially evenly along the length of the chamber 18. The splitter plate 52 increases the amount of time the exhaust gas has to mix with air and thus facilitates equal distribution of exhaust gas among the cylinders 12. The optimal size and placement of the apertures in the splitter plate will vary depending on the configuration of the particular air intake system of which it is a part. In the embodiment depicted, the apertures are approximately 15–20 mm in length and approximately 5–10 mm in width. Those skilled in the art will recognize that the splitter plate 52 may adversely affect volumetric efficiency of the engine; accordingly, it may be desirable to design and position the splitter plate with its effect on fresh air taken into consideration. The quantity and spacing of the apertures are preferably selected so that there is not a significant pressure drop between the upper chamber portion and the lower chamber portion.

In an alternative embodiment, and within the scope of the claimed invention, the EGR inlet may be on the manifold rather than on the conduit. In such an embodiment, exhaust gas would directly enter the upper chamber portion of the manifold from the EGR tube.

While the best mode for carrying out the invention has been described in detail, those familiar with the art to which this invention relates will recognize various alternative designs and embodiments for practicing the invention within the scope of the appended claims.

What is claimed is:

1. An engine comprising:
    a plurality of cylinders;
    an intake manifold defining a chamber, a manifold inlet, and a plurality of outlets;
    a plurality of runners enabling fluid communication between the outlets and the plurality of cylinders;
    a gas-permeable splitter plate dividing the chamber into a first chamber portion and a second chamber portion; a conduit operatively connected to the manifold inlet for providing air to the chamber; and
    an EGR inlet configured as a source of recirculated exhaust gas;
    wherein the outlets are separated from the first chamber portion by the splitter plate; and wherein the splitter plate is sufficiently positioned such that at least a portion of the recirculated exhaust gas from the EGR inlet enters the first chamber portion during engine operation.

2. An air intake system for an internal combustion engine, the air intake system comprising:
    an air intake manifold defining a chamber and having a manifold inlet and a plurality of outlets in fluid communication with the chamber;
    a plate defining a plurality of apertures and dividing at least a portion of the chamber into a first chamber portion and a second chamber portion; and
    a conduit having an EGR inlet configured to direct recirculated exhaust gas into the conduit; wherein the conduit is configured to convey gases, including at least air and the recirculated exhaust gas from the EGR inlet, into the manifold inlet; and wherein the plate extends at least to the manifold inlet such that when the gases from the conduit enter the chamber through the manifold inlet, the plate directs a portion of the gases into the first chamber portion and another portion of the gases into the second chamber portion.

3. The air intake system of claim 2, further comprising a plurality of runners, each extending from one of the outlets to a cylinder.

4. The air intake system of claim 2, wherein the plate separates the first chamber portion from the outlets.

5. The air intake system of claim 4, wherein the plate is sufficiently positioned with respect to the EGR inlet such that the majority of exhaust gas from the EGR inlet is directed into the first chamber during operation of the engine.

6. An air intake system for an internal combustion engine, the air intake system comprising:
    an air intake manifold defining a chamber and a plurality of outlets in fluid communication with the chamber;
    a gas-permeable member dividing at least a portion of the chamber into a first chamber portion and a second chamber portion; and
    an EGR inlet configured as a source of recirculated exhaust gas and sufficiently positioned with respect to the permeable member such that recirculated exhaust gas supplied by the EGR inlet during operation of the engine enters the first chamber portion; and wherein the permeable member separates the first chamber portion from the outlets.

7. The air intake system of claim 6, wherein the permeable member is a plate defining a plurality of apertures.

8. The air intake system of claim 6, wherein the manifold includes a manifold inlet in fluid communication with the chamber, and wherein the air intake system further comprises a conduit operatively connected to the manifold inlet and configured to convey air into the chamber.

9. The air intake system of claim 8, wherein the EGR inlet is operatively connected to the conduit for supplying recirculated exhaust gas to the conduit; and wherein the member extends at least to the manifold inlet.

10. The air intake system of claim 9, wherein the member is sufficiently positioned with respect to the EGR inlet such that the majority of exhaust gas from the EGR inlet is diverted into the first chamber portion during operation of the engine.

11. The air intake system of claim 10, further comprising a plurality of runners, each of the runners extending from one of the gas outlets for providing fluid communication from the chamber to an engine cylinder.

* * * * *